(12) United States Patent
McKenna et al.

(10) Patent No.: US 7,212,625 B1
(45) Date of Patent: May 1, 2007

(54) SYSTEM AND METHOD FOR PRESENTING QUEUE LENGTHS OF VARIOUS MEDIA USED BY SERVICE CENTERS

(75) Inventors: Kenneth McKenna, Stony Brook, NY (US); Jerry Lekhter, Forrest Hills, NY (US)

(73) Assignee: Nortel Networks Limited, St. Laurent, Quebec (CA)

( * ) Notice: Subject to any disclaimer, the term of this patent is extended or adjusted under 35 U.S.C. 154(b) by 897 days.

(21) Appl. No.: 10/032,027

(22) Filed: Dec. 20, 2001

(51) Int. Cl.
*H04M 3/00* (2006.01)

(52) U.S. Cl. .............................. 379/266.01; 379/266.02

(58) Field of Classification Search ................ 370/252; 379/266.01, 266.06, 266.02; 705/8
See application file for complete search history.

(56) References Cited

U.S. PATENT DOCUMENTS

| | | | | |
|---|---|---|---|---|
| 4,788,715 A | * | 11/1988 | Lee ............................. | 379/84 |
| 5,559,878 A | * | 9/1996 | Keys et al. ............. | 379/210.01 |
| 5,903,877 A | * | 5/1999 | Berkowitz et al. ............. | 705/26 |
| 6,327,364 B1 | * | 12/2001 | Shaffer et al. ......... | 379/265.02 |
| 6,389,028 B1 | * | 5/2002 | Bondarenko et al. ....... | 370/401 |
| 6,449,356 B1 | * | 9/2002 | Dezonno ............... | 379/265.01 |
| 6,487,291 B1 | * | 11/2002 | Walker et al. ......... | 379/266.02 |
| 6,490,350 B2 | * | 12/2002 | McDuff et al. ......... | 379/265.06 |
| 6,493,695 B1 | * | 12/2002 | Pickering et al. ............. | 706/47 |
| 6,498,845 B1 | * | 12/2002 | Martz et al. ................. | 379/230 |
| 6,738,473 B1 | * | 5/2004 | Burg et al. ............ | 379/266.01 |
| 6,754,333 B1 | * | 6/2004 | Flockhart et al. ...... | 379/266.01 |
| 6,801,619 B1 | * | 10/2004 | Bae ........................ | 379/266.01 |
| 6,813,636 B1 | * | 11/2004 | Bean et al. .................. | 709/226 |
| 7,046,789 B1 | * | 5/2006 | Anderson et al. ...... | 379/265.01 |
| 2003/0108187 A1 | * | 6/2003 | Brown et al. .......... | 379/266.03 |

* cited by examiner

*Primary Examiner*—Doris H. To
*Assistant Examiner*—Steve Blount
(74) *Attorney, Agent, or Firm*—Haynes and Boone, LLP

(57) ABSTRACT

There is provided, in a first form, a system and method for the holistic presentation of multiple media queue depths, which allows the customer to decide what media channel they want to use to make a call based on resource availability across multiple media. Further, this embodiment allows the call center to "cost" media channel services based on their business rules, salaries, calculated return on relationship, cost of different services, etc.

18 Claims, 2 Drawing Sheets

SYSTEM AND METHOD FOR PRESENTING QUEUE LENGTHS OF VARIOUS MEDIA USED BY SERVICE CENTERS

TECHNICAL FIELD

The invention relates in general to service centers, and in particular, to a system and method for presenting queue lengths of various media used by service centers.

BACKGROUND INFORMATION

Many service centers provide a variety of channels of communication or media so that they might respond to their customers. For instance, many service centers use traditional call centers, web pages, chat rooms, and e-mail. However, such media services are not well integrated. For instance, if a user calls a call center to request real time assistance, they might be furnished with information about how long they must wait before a resource agent will be able to respond. However, they will not be provided with the response time for e-mail requests or other service provider media. Similarly, if a user sends an e-mail request to the service center, the user might receive an immediate automated response e-mail stating that the request will be answered within a predetermined time, for instance, 48 hours. However, the automated response has no awareness of the actual wait time or queue depth for all other serviceable media. What is needed is a system where a user can be provided with the queue depth for multiple media so that the caller may choose which media to use.

SUMMARY OF THE INVENTION

The previously mentioned needs are fulfilled with the present invention. Accordingly, there is provided, in a first form, a system and method for the holistic presentation of multiple media queue depths, which allows customers to decide what media channel they want to use to make a call based on resource availability across all available media. In one embodiment, there is a method for managing service requests in a communications network, the method comprising: receiving a service request from a communications terminal, receiving status information from a plurality of service providers adapted to respond to the service request, calculating a queue result of the service request for each service provider, and sending the queue results to the communications terminal. The service center may determine the "cost" of various media channel services based on their business rules, salaries, calculated return on relationship, cost of different services, etc. This cost analysis provides better service to the customer and allows businesses to better manage their resource costs. It also allows businesses to present a caller's position in queue that reflects their level of relationship with the business.

These and other features, and advantages, will be more clearly understood from the following detailed description taken in conjunction with the accompanying drawings. It is important to note the drawings are not intended to represent the only form of the invention.

DETAILED DESCRIPTION OF THE INVENTION

The present invention provides a unique method and system for the holistic presentation of multiple media queue depths. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

Figure 1:
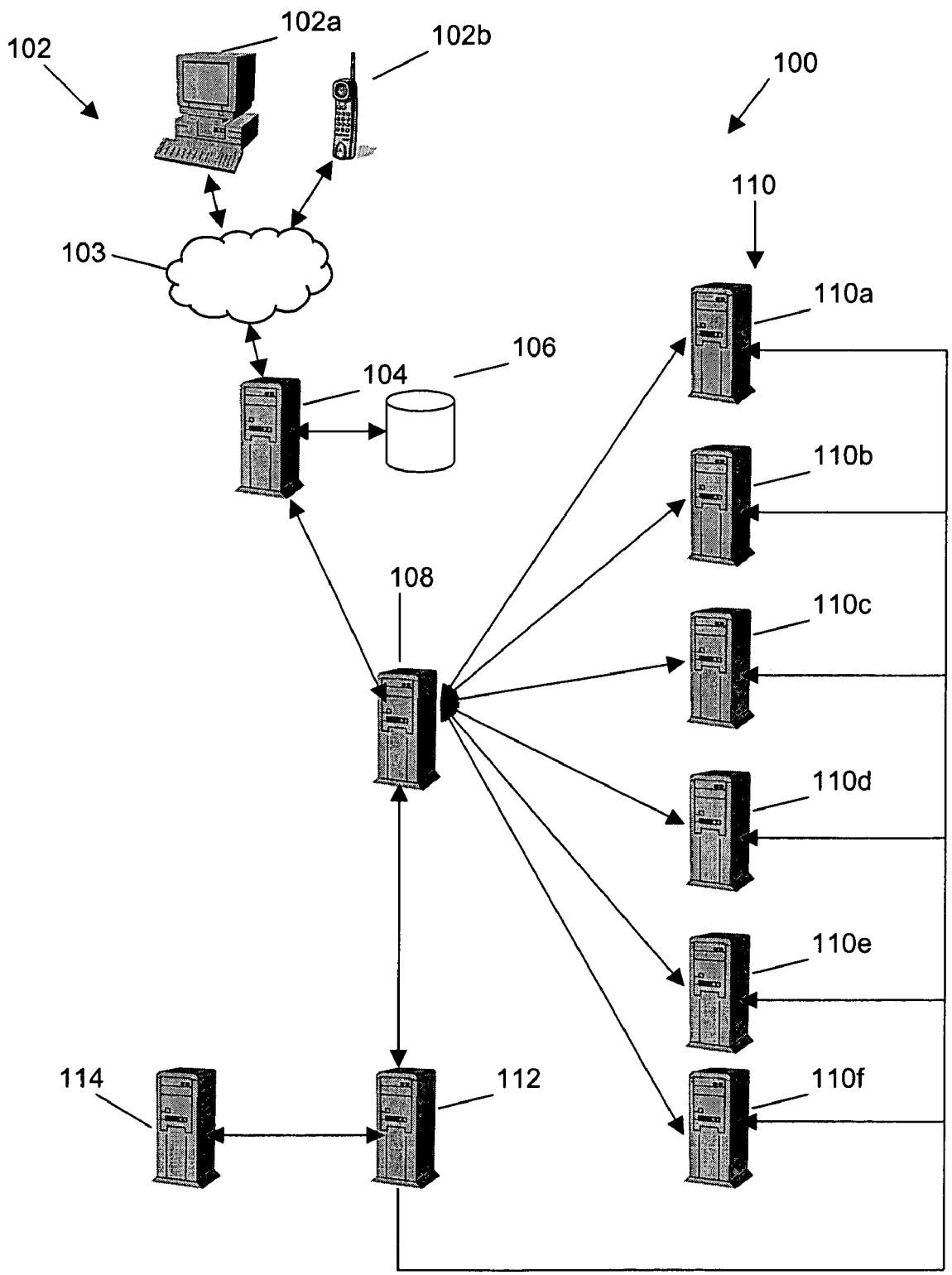
FIG. 1 is an exemplary system incorporating one aspect of the present invention.

Turning now to FIG. 1, there is presented an exemplary telecommunications network or system 100 in which certain aspects of the present invention are implemented. The system 100 may be, for example, a telephone network, a data network, or a communication network for mixed data, speech and video transmissions. In communication with the system 100, there is a plurality of communication terminals 102, which may include a computer 102a and a phone 102b. The plurality of communication terminals 102 are in communication with a computer server or "service request media" server 104, which may be part of a service center (not shown). The plurality of communications terminals 102 may communicate with the server request media server 104 through network 103, which may be a public switch telephone network ("PSTN") or a global data network, such as the Internet. If the communication is through a PSTN, the service request media server 104 may be a voice switch. On the other hand, if the communication is through a data network, the service request media server 104 may be a computer or program running on a computer. For purposes of this application, the term "server" means a software application program or module running on a computer that responds to requests of another computer or program. Thus, the "servers" or modules may run on the same physical computer or on entirely different computers.

In either case, it is the service request media server that initially handles calls from callers using the communication terminals 102. Such servers are widely known in the industry. For purposes of this application a "call" or "service request" is a media contact through a communication terminal initiated by a living human being. A call is initiated through a common media technology using a communication terminal, examples are telephone calls or Internet World Wide Web pages. A "caller" is a user of the communication terminal who is making contact with a service center. The contact is not limited to a voice call and could be an e-mail, chat, video or any other method by which a person attempts to communicate with a service center. Thus, the caller's contact could take place through a web site, e-mail, telephony call, web chat call, video contact, etc.

Turning back to FIG. 1, the service request server 104 is in communication with a customer information database 106, which could be internal and external data sources. Such "caller information data" could contain basic facts about a particular customer, including contact preferences from past contacts. Such caller information databases are widely used within the industry.

The service request server 104 is also in communication with a queuing server 108. The queuing server 108 is responsible for polling all available media or service providers 110 to determine the "status information" or availability of the resources of the connected service providers. Any given service provider could have a number of resources (e.g., agents) available to respond to the request. The queuing server 108 monitors the state of each service provider to determine the status information. The status information includes whether a particular service provider's resource is available to take calls, is currently on a call, or is unavailable for calls. The queuing server also may determine the capabilities of each resource, what skill they posses, which media they can handle, what proficiency they have when handling a call of a specific type. This information is used to construct databases of available resources per skill and media. Media queues can be constructed from these databases.

The queues track the placement and priority of the service requests for each service provider. The media or resource queues may be sorted by some well-known algorithm (e.g., least busy, first available, etc.). The attributes of the call (e.g., its media type, Automatic Number Identification ("ANI"), Dialed Number Identification Service ("DNIS") information, call reason, customer history, caller entered data, etc.) determine which available queue is appropriate for any given call.

For purposes of this application, a "service provider" is an addressable entity providing a media gateway and an application which polls and contains the status on all connected resources for that media. All status changes for media resources are reported to the service provider for that media. Thus, a service provider may be able to determine a "queue length" or "queue attribute" for that media resource. In other embodiments, the service provider may be able to track factors for the respective media which could be used to determine a "queue attribute." For purposes of this application, a "queue attribute" may be derived from the status information and may be expressed by the number of callers ahead of the caller in the queue or an estimation of how long the caller will wait before having the service request addressed. Thus, a queue attribute could be presented in the form of total wait time, average call duration, number of calls in queue, etc.

Such service providers 110 could include a web server 110*a*, an e-mail server 110*b*, a chat server 110*c*, a voice-over IP server 110*d*, a telephony automatic call distributor 110*e*, and a call back server 110*f*.

The queuing server 108 may also be in communication with a costing server 112. The costing server 112 calculates a "queue result" for each different service provider. A "queue result" is similar to a queue attribute, however, as will be explained in greater detail below, the queue result may reflect additional considerations based on business judgment rules.

In the illustrative embodiment, the costing server 112 is also in communication with a relationship server 114, which can be an external business relationship engine, such as a relationship server. The relationship server 114 aggregates the customer information data (which is typically raw data related to previous contact history) and provides a quantitative result that can represent the customer's net value to the service center. Such a server does not necessarily use data only associated with the contact history. It also uses other statistical and marketing data to determine if the customer's contact/spending habits fall within the range of his peer group. It allows the service center to not only look at historical contact data, but to also anticipate the worth of the customer to the entity operating the service center.

For example, an airline might group customers into four categories: platinum for people that fly more than 100,000 miles per year, gold for people that fly at least 50,000 miles per year, silver for people that fly at least 25,000 miles per year, and everyone else. Thus, the amount of revenue the airline is likely to receive from a specific customer is typically in proportion to the number of miles flown. For such reasons, the airline might wish to identify the category of the caller as quickly as possible during the call flow. A quick determination of the caller's category may allow for higher revenue generating customers to be serviced at a quicker rate because such customers are likely to have more impact on the airline's revenue.

Figure 2:
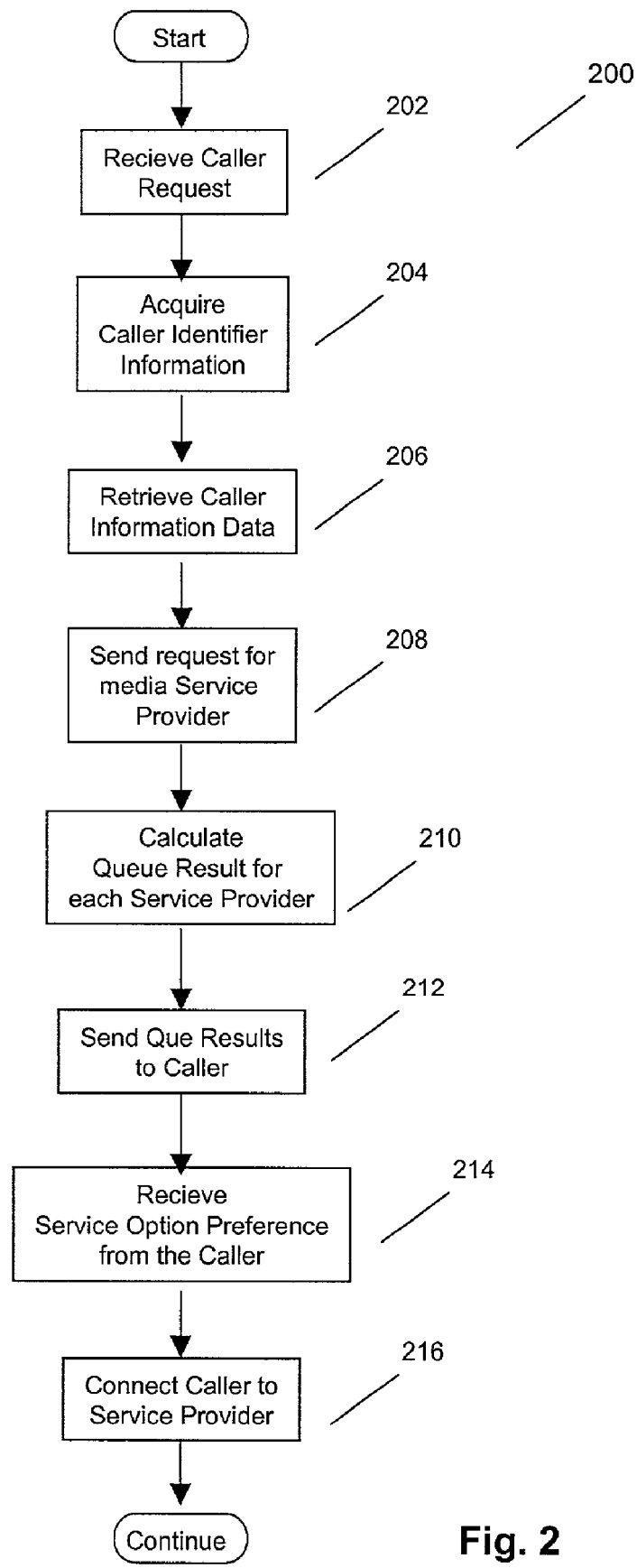
FIG. 2 is an exemplary process flow diagram illustrating one aspect of the present invention.

Turning now to FIG. 2, there is presented an exemplary method or process 200 of one aspect of the present invention. The process begins at step 202, where a caller generates a call or "service request" that is received by the service request media server 104. The service request is "parked" until the call can be connected to a service provider. The call is said to be "parked" when the call remains at the server request server. The service request server can be a voice switch or World Wide Web Page. While the service request is parked, the request is assigned a tracking number or contact identifier for that call. The use of a contact identifier allows data to be linked to the contact identifier for the duration of the call.

In step 204, caller identification information is acquired for the service request via typical caller identifying methods. If the service request is a telephone call, then it is possible to receive Caller ID/Automatic Number Identification (ANI) or Dialed Number Identification Service (DNIS) information. If the service request is through the Internet, then the contact information includes: an IP address, customer identification number (if previously identified on the Web Page), and an e-mail address.

In step 206, the service request server may use the caller identification information to query or lookup customer information data from the customer information database 106. The customer information database 106 may be either internal or an external data source. Such customer information data may include historic, caller contact preferences gathered from past contacts, or such information can be acquired via a Web page if the call is a Web call or via touchtone or speech recognition prompts if the call is a telephone call. Thus, a customer information record for the call may be established and linked to the contact identifier for that call.

In step 208, the service request server sends a request to the queuing server 108 for an available and appropriate media service provider 110*a* through 110*f* to respond to the service request. When the queuing server 108 receives the request, it places the request at the end of all available media queues for the various service providers 110*a* through 110*f*. The queuing server 108 also passes the service request and the retrieved customer-information data to the costing server 112.

In step 210, the costing server 112 calculates a "queue result" for each different service provider resource based on a "queue attribute" and "queue factor" for each service provider. As previously discussed, the queue attribute for each service provider resource is based on the actual queue depth, estimated wait time or average call duration, the number of calls in the queue calculated by the queuing engine, estimated resource availability, or any combination of factors typically used in the industry. If it is determined that a specific service provider is not available, the queue attribute for this service provider can be set to a predetermined value.

The "queue factor" is a mathematical factor that acts upon the queue attribute to calculate the queue result. In other words, the queue result is a function of the queue attribute and the queue factor. The queue factor can be based on external value attributes such as value of the customer to a business, the estimated return on relationship, or the salary expense of a particular resource agent. The effect of the queue factor on the queue attribute will be to change the queue result based on the relation of that contact to the business.

In the illustrated embodiment, the queue factor is determined by passing the customer information data to an external business relationship server or engine, such as the relationship server 114. The relationship server 114 then calculates the queue factor according to business rules established for the caller. The queue factor can either reduce or increase the queue attributes for each service provider. If it is determined that a particular caller should not be offered a particular service provider 110*a*–110*f*, the queue attribute for that particular service provider can be set to "0." For example, a "business rule" could be established for a class of airline customers (e.g., platinum) to assure that higher level customers will have additional resources available to them than other categories of customers. Thus, their wait will be less.

The queue result, therefore, is an estimated "wait time" that reflects both the actual availability of a service provider and the business relationship of the caller with the service center. If either the queue attribute or the queue factor is set to reflect an unavailability of a specific service provider 110*a*–110*f* for that individual caller, the queue result for the associated service provider will be set to a predetermined value to reflect the unavailability of the service provider (such as "0").

After the queue results for each service provider 110*a*–110*f* have been calculated, the costing server 112 passes the queue results back to the queuing server 108. If the queue result for any service provider is set to a predetermined value, such as "0," the queuing server 108 will know that associated service provider is not to be offered to the caller as a service provider option.

In step 212, the queuing server 108 passes the available queue results back to the caller via the service request server 104. Thus, the caller will then know available options for service. For instance, if the communications terminal is a phone, a menu might be played. The voice menu could state that the current wait for talking to someone at the call center is 35 minutes, and the wait for an e-mail response is currently 15 minutes. If the user is using a communication terminal with a display, a table or menu of the service providers and the queue result for each service provider might be displayed. The caller may then select a service provider by any number of traditional methods, such as using a keypad to select from a voice menu or using a pointing device to select from a visual display. Once the caller has made the selection or determined his preference, the preference is sent to the service request server 104.

In step 214, the service request server 104 receives the selection from the applicable communications terminal 102*a*–102*b*. The service request server 104, in response, passes the selection to the queuing server 108. In one embodiment, the queuing server 108 maintains the caller's service request position in the queue of the various service providers until the call is connected to a service provider. Thus, the caller can change his mind and select a different service provider without losing his position in the various queues. In another embodiment, the queuing server 108 only maintains the position in the queue associated with the selected service provider and releases the queue position of the service request in the other (i.e., non-selected) service providers.

In either embodiment, once the caller's selection rises to the top of the queue of the selected service provider, in step 216, the queuing server 108 routes the call (parked in the service request server 104) to the selected service provider so that the caller can be connected to the service provider. The caller may continue his call with the selected service provider.

However, in some instances the caller may have to change media, and thus, would terminate the connection with the service request server 108. For instance, if a telephone caller chooses a web chat service provider, the caller may have to hang up and connect through the Internet. The second connection is logically linked to the first connection. Thus, the disconnection of the first connection may not remove the caller from the queues until a predetermined amount of time has occurred.

Other aspects of the present invention are also possible. For instance, if the caller is deciding upon a service provider, and if the call rises to the top of a particular service provider queue and is the next call to be answered, but the service provider has not been selected by the caller, the service provider may allow other calls, behind the caller's call to be answered until the caller either selects that service provider or another.

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. A communications system comprising:
    a communication module adapted to receive service requests from a plurality of communication terminals, wherein the communication module is also adapted for sending available queue results to a communication terminal of the plurality of communication terminals,
    a queuing module in communication with the communication module, wherein the queuing module is configured for communicating with a plurality of service providers and is adapted to receive respective status information from each of the plurality of service providers; and
    a queuing results module in communication with the queuing module, wherein the queuing results module contains instructions for determining a queue result from each respective status information, wherein the queuing module further contains instructions for managing a queue of service requests for each service provider in the plurality of service providers;
    wherein the queuing results module further comprises a queuing attribute module in communication with the queuing module for determining queue attributes of each service provider in communication with the queuing module, a queuing factor module in communication with the queuing results module for quantifying business relationships, and a customer relationship database for storing historic data regarding business relationships.

2. The system of claim 1 further comprising a connecting module for connecting the service request to one of the plurality of service providers.

3. The system of claim 1 further comprising a user interface module for receiving a service provider preference for use with the queuing module.

4. The system of claim 1, wherein each service provider is selected from a group consisting of a web server, an e-mail server, a chat server, a voice over IP server, a telephone automatic call distributor, and a call back server.

5. The system of claim 1 wherein the queuing factor module further comprises instructions for determining a queuing factor.

6. The system of claim 1 wherein the queuing factor module further comprises:
  a costing module in communication with the queuing module, wherein the costing module contains instructions for quantifying business relationships; and
  a customer relationship database coupled to the costing module for storing historic data regarding the business relationships.

7. The system of claim 1, wherein the communications module further comprises a call identification module adapted for determining call information data.

8. The system of claim 7 further comprising a customer information module in communication with the caller identification module, wherein the customer information module is adapted for determining an identification of a caller associated with the call identification data.

9. The system of claim 1, further comprising a tracking number module in communication with the communication module, wherein the tracking number module is adapted to assign tracking numbers to the service requests.

10. A communications system comprising:
  a communication means for receiving service requests from a plurality of communication terminals, wherein the communication means is also adapted for sending available queue results to a communication terminal of the plurality of communication terminals wherein the communications means further comprises a means for determining call information data such that an identity of a caller can be determined;
  a queuing means in communication with the communication means, wherein the queuing means is configured for communicating with a plurality of service providers and is adapted to receive respective status information from each of the plurality of service providers and for tracking the resources of a plurality of service providers; and
  a queuing results means in communication with the queuing results means for determining queue results, wherein the queuing results means comprises a queuing attribute means for determining the queue attributes of each service provider, and a queuing factor means for quantifying business relationships, and a customer relationship database for storing historic data regarding business relationships; and
  wherein the queuing results means contains instructions for determining a queue result from each respective status information, wherein the queuing module further contains instructions for managing a queue of service requests for each service provider in the plurality of service providers.

11. The system of claim 10, further comprising a means for managing a plurality of queues for the plurality of service providers.

12. The system of claim 11, further comprising a means for tracking customer information.

13. The system of claim 10 wherein the queuing factor means further comprises instructions for determining a queuing factor.

14. The system of claim 10 wherein the queuing factor means further comprises:
  a costing means in communication with the queuing means, wherein the costing means comprises instructions for quantifying business relationships; and
  a customer relationship database coupled to the costing means for storing historic data regarding the business relationships.

15. The system of claim 10 further comprising a tracking number means in communication with the communication means, wherein the tracking number means is adapted to assign tracking numbers to the service requests.

16. A method of managing service requests in a communications network, the method comprising:
  responsive to receipt of service requests from a plurality of communication terminals, sending available queue results to a communication terminal of the plurality of communication terminals;
  determining call information data such that an identity of a caller can be determined;
  communicating with a plurality of service providers to receive respective status information from each of the plurality of service providers and to track the resources of a plurality of service providers; and
  determining queue results, wherein the determining queuing results comprises determining the queue attributes of each service provider, quantifying business relationships, and storing historic data regarding business relationships; and
  determining a queue result from each respective status information and managing a queue of service requests for each service provider in the plurality of service providers.

17. The method of claim 16 further comprising managing a plurality of queues for the plurality of service providers.

18. The method of claim 16 further comprising tracking customer information.

* * * * *